United States Patent
Beadle et al.

(10) Patent No.: US 7,885,937 B2
(45) Date of Patent: Feb. 8, 2011

(54) MAPPING ONLINE CONTACT INFORMATION INTO A CONTACTS LIST

(75) Inventors: Gary M. Beadle, Austin, TX (US); Michael L. Masterson, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 489 days.

(21) Appl. No.: 11/866,114

(22) Filed: Oct. 2, 2007

(65) Prior Publication Data

US 2009/0089308 A1  Apr. 2, 2009

(51) Int. Cl.
*G06F 7/00* (2006.01)
*G06F 15/16* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)

(52) U.S. Cl. .......... 707/673; 715/207; 709/217

(58) Field of Classification Search .......... None
See application file for complete search history.

(56) References Cited

U.S. PATENT DOCUMENTS

| | | | |
|---|---|---|---|
| 6,466,969 B1 | 10/2002 | Bunney et al. | |
| 6,564,254 B1* | 5/2003 | Shoji et al. | 709/217 |
| 6,735,615 B1 | 5/2004 | Iwayama et al. | |
| 6,957,383 B1* | 10/2005 | Smith | 715/207 |
| 6,968,360 B1 | 11/2005 | Morrow et al. | |
| 7,236,976 B2* | 6/2007 | Breitenbach et al. | 1/1 |
| 7,395,329 B1 | 7/2008 | Holt et al. | |
| 7,437,413 B2 | 10/2008 | Okuyama et al. | |
| 7,516,185 B2 | 4/2009 | Knoerle et al. | |
| 7,548,756 B2 | 6/2009 | Velthuis et al. | |
| 7,587,457 B2 | 9/2009 | Fujibayashi | |
| 7,640,300 B2 | 12/2009 | Wohlgemuth et al. | |
| 7,657,605 B2 | 2/2010 | Blohm | |
| 7,711,782 B2 | 5/2010 | Kim | |
| 7,752,273 B2 | 7/2010 | Ito et al. | |
| 2003/0182290 A1* | 9/2003 | Parker | 707/100 |
| 2004/0122901 A1 | 6/2004 | Sylvain | |
| 2005/0027716 A1* | 2/2005 | Apfel | 707/100 |
| 2006/0080344 A1* | 4/2006 | McKibben et al. | 707/100 |

(Continued)

OTHER PUBLICATIONS

Shelly Farnham; Personal Map; 2003; IOS Press; pp. 567-574.*

(Continued)

*Primary Examiner*—Neveen Abel Jalil
*Assistant Examiner*—Jermaine Mincey
(74) *Attorney, Agent, or Firm*—DeLizio Gilliam, PLLC (57) ABSTRACT

A presence management system may communicate contact information with mapped values. Contact information may be stored in a hierarchical, extensible structure ("hierarchical extensible contact structure"). Devices in a presence management system utilize a mapping scheme to map contact values (e.g., e-mail address, phone number, etc.) to the appropriate field of the hierarchical extensible contact structure. When devices in the presence management system communicate information for thousands of contacts, employing mapped values to navigate the hierarchical extensible contact structure reduces the size of the messages, thus reducing resource consumption (e.g., bandwidth), particularly on the scale of an enterprise.

10 Claims, 9 Drawing Sheets

U.S. PATENT DOCUMENTS

| | | | |
|---|---|---|---|
| 2007/0124386 | A1 | 5/2007 | Klassen |
| 2007/0174310 | A1* | 7/2007 | Arrouye et al. ............ 707/100 |
| 2008/0208990 | A1 | 8/2008 | Markus et al. |
| 2009/0088144 | A1 | 4/2009 | Beadle et al. |
| 2009/0089804 | A1 | 4/2009 | Beadle et al. |

OTHER PUBLICATIONS

Smale, Stephanie et al., "Broadcasting information via display names in instant messaging", *In Proceedings of the 2005 international ACM SIGGROUP Conference on Supporting Group Work* (Sanibel Island, Florida, USA, Nov. 6-9, 2005)., Group '05. ACM Press, New York, NY DOI= http://doi.acm.org/10.1145/1099203.1099218,(Nov. 6, 2005),89-98.

Murnan, Cynthia A., "Expanding communication mechanisms: they're not just e-mailing anymore", *In Proceedings of the 34th Annual ACM SIGUCCS Conference on User Services* (Edmonton, Alberta, Canada, Nov. 5-8, 2006)., SIGUCCS '06. ACM Press, New York, NY, 267-272. DOI=http://doi.acm.org/10.1145/1181216.1181275,(Nov. 5, 2006),267-272.

Hansen, Klaus M., et al., "Instant collaboration: using context-aware instant messaging for session management in distributed collaboration tools", *In Proceedings of the Second Nordic Conference on Human-Computer interaction* (Aarhus, Denmark. Oct. 19-23, 2002)., NordiCHI '02, vol. 31. ACM Press, New York, NY, 279-282. DOI=http://doi.acm.org/10.1145/572020.572065,(Oct. 19, 2002),279-282.

Fong, et al., "Towards an open protocol for secure online presence notification", (2001),311-324.

"U.S. Appl. No. 11/866,090 Office Action", Aug. 5, 2010, 18 pages.

* cited by examiner

MAPPING ONLINE CONTACT INFORMATION INTO A CONTACTS LIST

TECHNICAL FIELD

Embodiments of the invention(s) generally relate to the field of presence management, and, more particularly, to mapping contact information into a contacts list.

BACKGROUND

Two typical concerns with users of mobile devices (e.g., cell phones, personal data assistants, etc.) are byte rate usage and power consumed by transmitting and receiving data while using an instant messaging type application. Typically, mobile plans that otter data services over General Packet Radio Service (GPRS) charge for the amount of bytes used in a specific period of time. The bandwidth available to subscribers with over the air network services, such as GPRS and Enhanced Data Rates for GSM Evolution (EDGE), is fairly limited. Using a number of device applications, such as instant messenger (IM), a web browser, and synchronization clients all at the same time consumes this limited bandwidth and cause delays in data transmission.

SUMMARY

A method comprises mapping an online contact identifier to a first mapping value that corresponds to an entry in a first hierarchical extensible contact list at a first device. The online contact identifier represents contact values that facilitate communication with a contact identified with the online contact identifier. A first of the contact values is mapped to a second mapping value from a contact field identifier of a first contact field of the first hierarchical extensible contact list. The mapping of the online contact identifier and the mapping of the first contact value conform to a mapping scheme established at the first device and a second device. The first mapping value and the second mapping value are used to communicate the first contact value for a corresponding second contact field of a second hierarchical extensible contact list at the second device. The contact field identifier identifies the second contact field.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the presently described embodiments of the inventions). However, it is understood that the described embodiments may be practiced without these specific details. For instance, although examples refer to a contact list, contacts may be encoded in any of a variety of structures and embodiments should not be limited to "list" type structures, such as a linked list or array. Example implementations of a contact list include hash tables, trees, hybrids of trees and tables, etc. In other instances, well-known instruction instances, protocols, structures and techniques have not been shown in detail in order not to obfuscate the description.

The following description uses the terms "identity," "contact," "presence management", "presence management system." The terms "identity" and "contact" are used to refer to a representation of a user, but from different perspectives. For example, a first user has an identity "user1". A contact list for "user1" includes a contact "user2." A second user has the identity "user2," and maintains a contact list that includes contact "user1". With respect to the first user, "user1" is an identity and "user2" is a contact. With respect to the second user, "user2" is an identity and "user1" is a contact. These two terms "identity" and "contact" are typically preceded in this description by "online" since these represent an online presence. The term "presence management" is used to refer to functionality for managing of online presence information for contacts. The term "presence management system" is used to refer to the devices (e.g., client, server, mobile phone, etc.) that read, write, communicate, process, and/or display presence management information (e.g., status of contacts, contact information, etc).

Managing online presence information for contacts involves propagating contact status updates from a contact to an interested identity. A contact list may include hundreds to thousands of contacts for an identity. When one of those contacts changes presence status (e.g., from available to do-not-disturb), the change is propagated from a device of the contact, to a server, to one or more devices of the identity maintaining the contact list. Although that single change or status update consumes a small amount of resources, status updates for a larger number of contacts occurring at various times consumes a more substantial amount of resources, including bandwidth and power. Although power consumption may not be a factor for a desktop computer, power consumption for large scale and/or frequent status updates on devices with a more limited power source (e.g., mobile phones, personal data assistants, etc) may be a significant factor.

Figure 1:
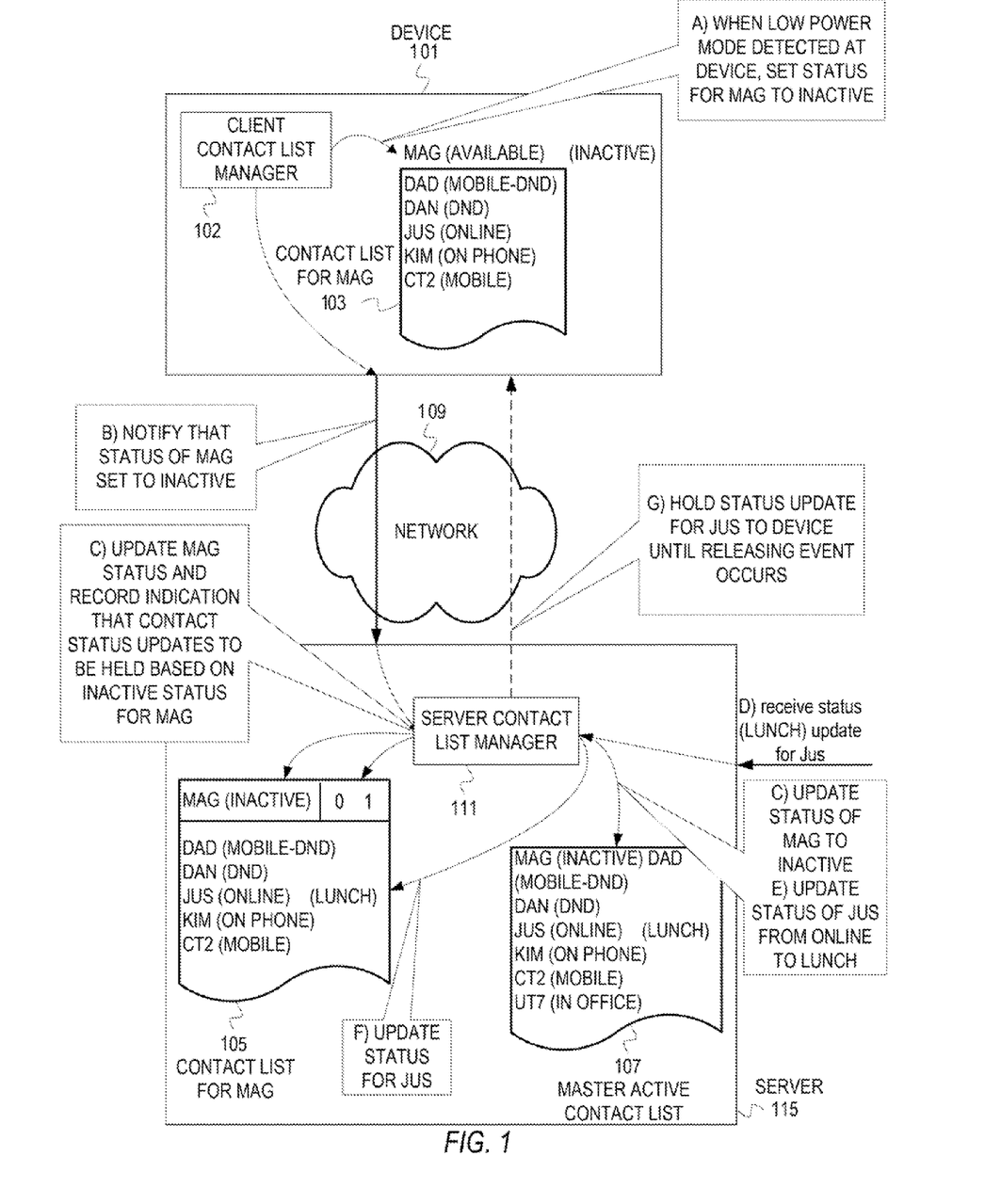
FIG. 1 depicts an example of a server holding a contact status update after a contact status update hold event; occurs.

FIG. 1 depicts an example of a server holding a contact status update after a contact status update hold event occurs. A device 101 includes a client contact list manager 102 and a contact list 103 for an identity "Mag." The contact list 103 is depicted with contacts "Dad," "Dan," "Jus," "Kim," "CT2" with respective presence statuses of "MOBILE-DND", "DND" (do-not-disturb), "ONLINE," "ON PHONE," "MOBILE." A presence status for Mag indicates "AVAILABLE." A low power event occurs at the device 101 (e.g., the device goes into sleep mode due to lack of use, the device 101 switches from an external power source to an internal battery, etc.). When the low power event is detected, the client contact list manager 102 changes presence status for Mag from "AVAILABLE" to "INACTIVE." A low power event is only one example of a contact status update hold event. Other examples of a contact status update hold event include a manual presence status change, an automatic presence status change, a manual low power event, an automatic low power event, a low use event, etc.

After the contact status update hold event, the client contact list manager unit 102 causes a notification to be sent from the device 101 to a server 115 via a network 109. The notification notifies the server 115 that the presence status of Mag has changed to "INACTIVE." The server 115 includes a server contact list manager 111, a contact list 105 for Mag, and a master online contact, list 107. The contact list 105 is depicted with the same contacts as those in the contact list 103 at the device 101. The server 115 maintains a contact list for multiple identities, including Mag. The contact list 105 for Mag is only depicted to avoid unnecessarily complicating the example illustration. The server 115 also maintains the master online contact list 107. The master online contact list 107 tracks presence status of all online contacts (i.e., contacts that are "connected"). The active contact list 107 is depicted with contacts "Mag," "Dad," "Dan," "Jus," "Kim," "CT2," and "UT7" with respective presence statuses of "INACTIVE," "MOBILE-DND," "DND," "ONLINE," "ON PHONE," "MOBILE," and "IN OFFICE." The server contact list manager 111 propagates status updates for contacts in the active contact list 107 to contact lists of interested identities.

In response to the notification from the device 101, the server contact list manager 111 performs multiple updates. The server contact list manager 111 updates the contact list 105 and the master online contact list 107 to reflect the change in presence status for Mag to "INACTIVE," The server contact list manager 111 also records an indication that contact status updates are to be held at the server 115 and not further propagated to the device 101 due to the occurrence of the contact status update event at the device (i.e., the presence status update to INACTIVE), in the example illustration of FIG. 1, the server contact list manager 111 is depicted as updating a value (e.g., a bit) in the contact list 105 to indicate that contact status updates are to be stalled at the server.

At some point, presence status for contact Jus changes from ONLINE to LUNCH. The server contact list manager 111 updates presence status for Jus in the active contact list 107 and In the contact list 105 for Mag. The contact status update for Jus, however, is not delivered to the device 101. The server contact list manager 111 refrains from delivering contact; status updates for Mag to the device 101 while the value orbit associated with the contact list 105 is set to indicate contact status updates are to be held. Presence status for several contacts may change, perhaps multiple times, while this holding value is set. Indeed, presence status for a contact may change several times and eventually return to the presence state prior to the holding event. When a releasing event occurs, status updates for the contacts in the contact list 105 are communicated to the device 101. A releasing event may occur at the server 115 or may occur at the device 101. Examples of a releasing event include expiration of a time period, notification from the device 101 to the server 115 that power source has changed, a use event that indicates high use or normal use is communicated, an automatic or manual change in status of Mag from INACTIVE to a more active presence status, a directive at the server 115 to communicate changes in presence status, etc.

After a releasing event occurs, the task of determining which status updates to communicate may be implemented differently. In a first example, the server contact list manager 111 may maintain a current presence state for all contacts in a contact list and an initial presence status for the contacts. After the release event, the server contact list, manager 111 walks the List and compares the current and the initial presence status to determine which contacts have a different presence status since the hold value was set. In another example, each contact in a contact list is associated with a "dirty bit." If a change in presence status occurs for a contact during the hold, then the server contact list manager 111 sets the dirty bit, which indicates a change has occurred. The server contact list manager 111 determines which contacts have their dirty bit set, and communicates contact status updates for those contacts.

In addition to implementing tasks differently, different implementations may store and organize the data differently. For example, contact lists depicted in FIG. 1 most likely do not maintain redundant indications of contacts and in a monolithic contact list, although such implementations are also possible. An embodiment may maintain a structure that is associated with an identity, and references to contacts and their information. The "contact list" at the server would identify the identity (e.g., Mag) and have references (e.g., pointers, hash values, indices, etc.) to the master online contact list. In addition, a master contact list, may not be limited to online contacts, and may also indicate offline contacts. In another embodiment, a comprehensive contact list at a server represents presence status for contacts, and includes (or references) a structure that identifies (e.g., by hash value, pointers, indices, etc.) interested identities. In yet another embodiment, the server contact list manager 111 may maintain a structure of hold values for identities separately from contact lists, and not necessarily integrated into a contact list.

Figure 2:
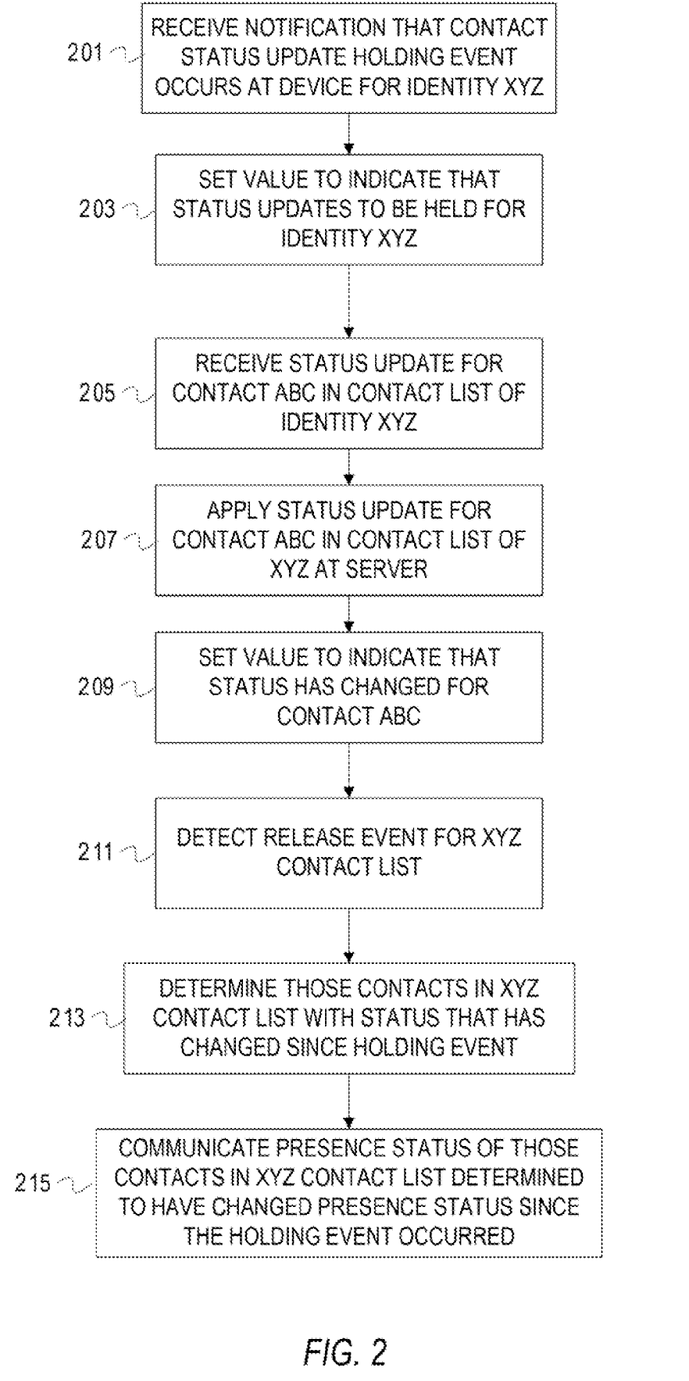
FIG. 2 depicts a flowchart of example operations for holding contact status updates.

FIG. 2 depicts a flowchart of example operations for holding contact status updates. At block 201, a notification is received that a contact status update holding event has occurred at a device for identity XYZ. At block 203, a value is set to indicate that status updates for contacts of XYZ are to be held. A dashed line from block 203 to block 205 indicates that the flow of control is not necessarily at distinct times (e.g., time that passes between operations of blocks 203 and 205 may vary).

At block 205, a presence status update is received for a contact ABC, which is in the contact list of XYZ. At block 207, the received presence status updates for ABC is applied in a contact list of XYZ in a server. At block 209, a value is set to indicate that presence status has changed for identity ABC. A dashed line represents flow of control from block 209 to block 211.

At block 211, a release event is detected that affects the XYZ contact list. At block 213, those contacts in the XYZ contact list that have changed presence status since the holding event are determined. At block 215, the presence status of those contacts in the XYZ contact list determined to have changed presence status since the holding event are communicated to a device of the identity XYZ.

Holding presence status updates for contacts across a presence management system reduces bandwidth consumption and power consumption. Fewer status updates are being communicated, tints less data is being transmitted across a network. Devices with limited power supplies handle fewer presence status updates for contacts, thus less power and cycles are spent processing messages communicating status updates and transmitting acknowledgements to such messages.

Communicating information about a contact, such as presence status, may also be regulated in accordance with priority values associated with contacts. Various parameters about contacts with respect to a particular environment may be collected and utilized to assign priority values to the contacts. Flow of information about the contacts is regulated based on the assigned priority values. Information about contacts with higher priority values may be communicated more frequently to client devices from one or more servers than those contacts with lower priority values. In addition, information about contacts associated with priority values that satisfy one or more criteria (e.g., threshold priority value) may be prefetched from a server to a client device.

Figure 3:
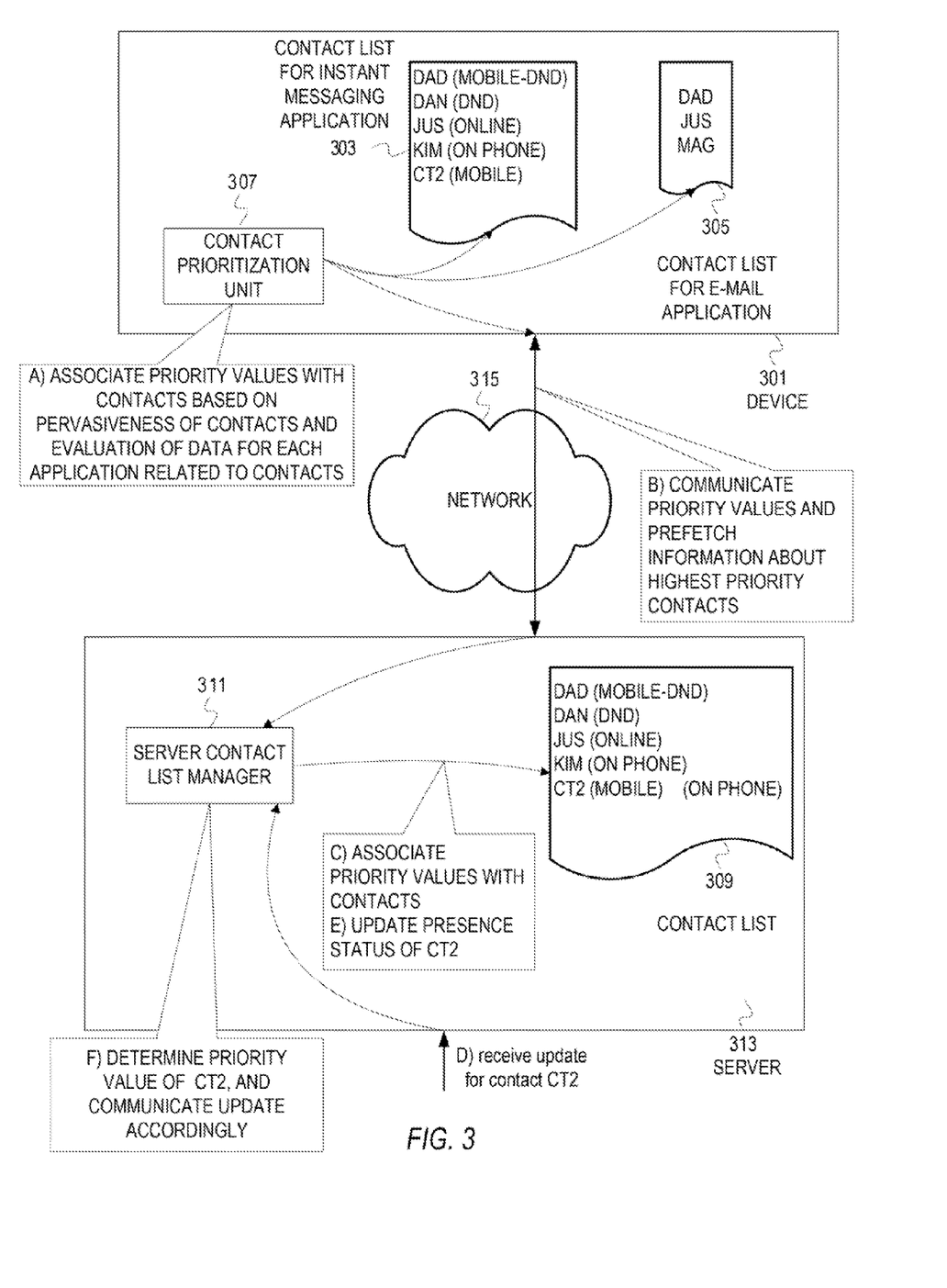
FIG. 3 depicts an example presence management system that regulates flow of contact information based on priority values of contacts.

FIG. 3 depicts an example presence management system that regulates flow of contact information based on priority values of contacts. A presence management system includes a device 301 and a sever 313 that communicate via a network 315. The device 301 includes a contact prioritization unit 307, a contact list 303 for an instant messaging application, and a contact list 305 for an e-mail application. The contact list 303 is depicted with contacts Dad, Dan, Jus, Kim, and CT2. The contact list 305 is depicted with contacts Dad, Jus, and Mag.

The contact prioritization unit 307 associates priority values with contacts in the contact lists 303 and 305 based on pervasiveness of the contacts and evaluation of data of the instant messaging application and the e-mail application. The contact prioritization unit 307 may use any of a number of prioritization schemes. Examples of prioritization schemes include prioritizing based only on pervasiveness of contacts on the device 301, prioritizing based only on evaluation of data of applications that use the contacts, prioritizing based on one or more heuristics, or any combination of prioritizing schemes.

In FIG. 3, the contacts Dad and Jus occur in both contact lists 303 and 305. The contacts Dad and Jus are assigned with priority values (or preliminary priority values) higher than those assigned to the other contacts, because Dad and Jus occur in both contact lists 303 and 305. The repeated occurrence of contacts in multiple contact lists suggests more frequent contact and/or a greater likelihood that these contacts will be accessed. The assigned priority values may be preliminary because the contact prioritization unit 307 may adjust the assigned priority values based on other parameters, such as access history by a user, annotation and/or tags associated with contacts, etc. The contact prioritization unit 307 may also dynamically adjust assigned priority values based on observed events, such as time of day contacts are accessed, data transmitted to contacts, type of communications and content of communications to contacts, etc. In addition, applications may be weighed differently, thus giving more weight to the contacts used by the application(s) with greater weight.

The contact prioritization unit 307 communicates the priority values to the server 313. The contact prioritization unit 307 also prefetches information about contacts with the highest priority values (e.g., those with priority values above a given threshold). The server 313 includes a contact list 309, which is depicted as having the same contacts as the contact list 303. A server contact list manager 311 associates the communicated priority values with the contacts in the contact list 309. At some point, a presence status update for CT2 is received. The server contact list manager 311 updates the presence status of CT2 in the contact list 309. The server contact list manager 311 then determines the priority value associated with CT2, and communicates the presence status update accordingly. For instance, information for contacts associated with priority values of 'A' may be communicated immediately, whereas information for contacts associated with priority values of 'C' may be communicated at the earliest of expiration of a time period or by piggybacking on another message to the instant messaging application.

Figure 4:
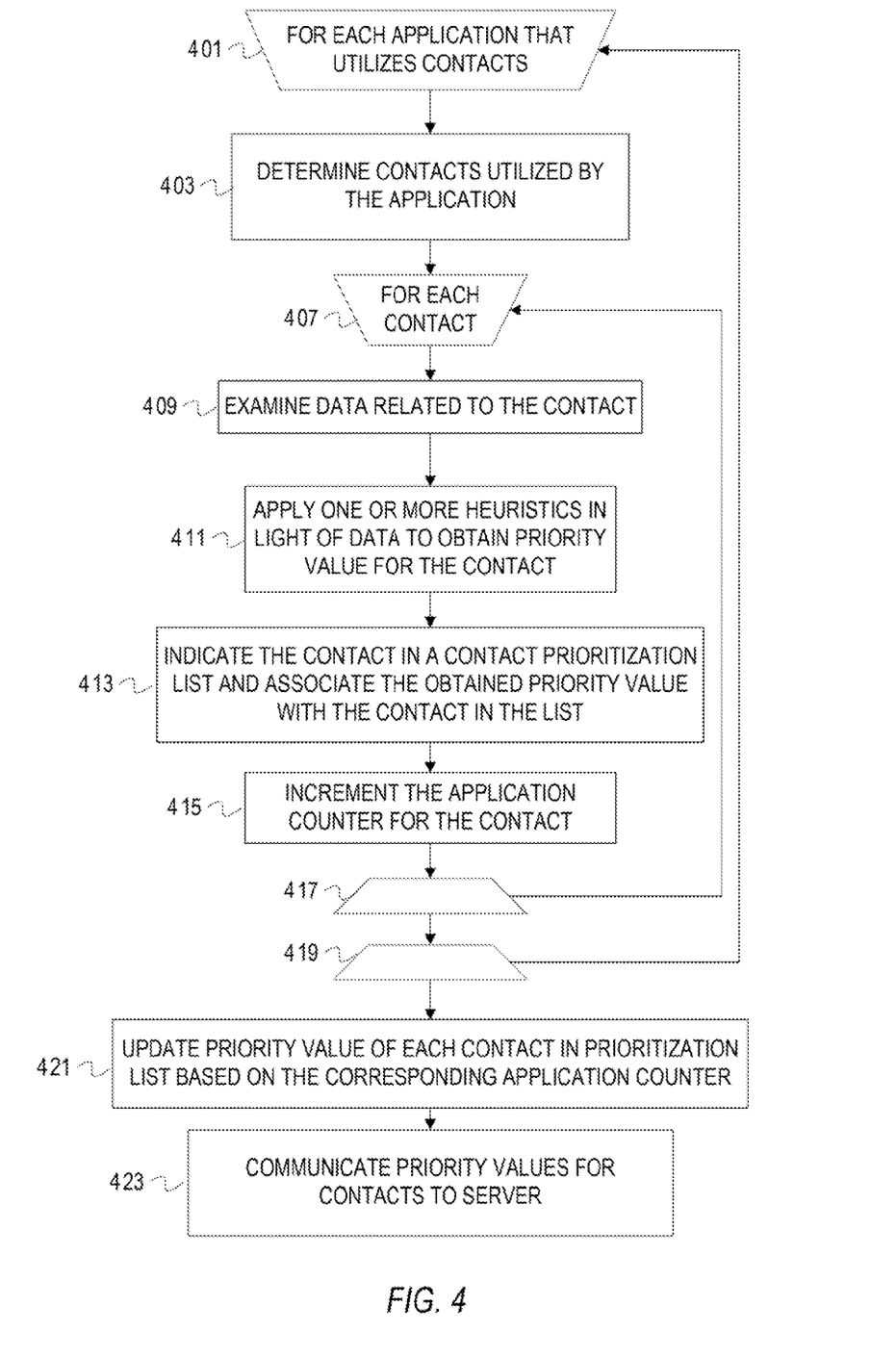
FIG. 4 depicts a flowchart of example operations for assigning priority values to contacts.

FIG. 4 depicts a flowchart of example operations for assigning priority values to contacts. At block 401, a loop of operations begins for each application that utilizes contacts. At block 403, contacts utilized by the application are determined. For example, a list is built or contacts in an already existing list are marked.

At block 407, another loop of operations begins for each contact determined at block 403. At block 409, data related to the contact is examined. For example, category tags are examined to determine business contacts and personal contacts. At block 411, one or more heuristics are applied in light of the examined data to obtain a priority value for the contact. For instance, greater priority values may be assigned to contacts tagged as business contacts. At block 413, the contact is indicated in a contact prioritization list, unless already in the prioritization list. Also at block 413, the obtained priority value is associated therewith. In one embodiment, a contact prioritization list is built separately from the existing contact lists. In another embodiment, one of the existing contact lists is used as the contact prioritization list. In another embodiment, one of the existing contact lists was defined to accommodate priority values for prioritization of contacts. At block 415, an application counter for the contact is incremented. At block 417, control either returns to block 407 or proceeds to block 419 if all of the contacts for the application have been evaluated. At block 419, control either returns to block 401 or proceeds to block 421 if there are no other applications that utilize contacts.

At block 421, the priority value of each of the contacts is updated based on the corresponding application counter. At block 423, the priority values are communicated to a server.

Figure 5:
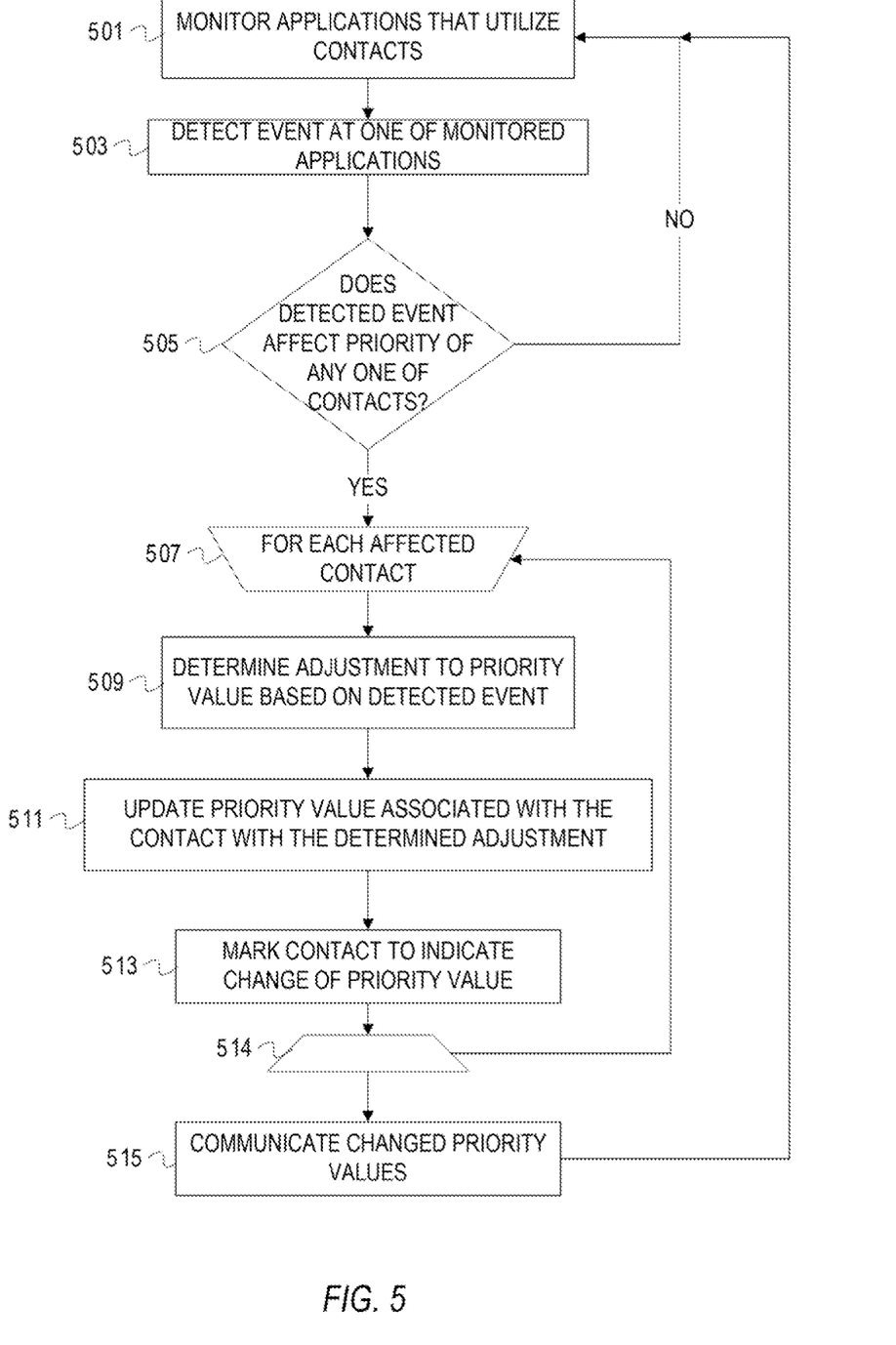
FIG. 5 depicts a flowchart of example operations for dynamically updating priority values of contacts.

FIG. 5 depicts a flowchart of example operations for dynamically updating priority values of contacts. At block 501, applications that utilize contacts are monitored. At block 503, an event is detected at one of the monitored applications. At block 505, it is determined if the detected event affects priority of any one of the contacts, if the detected event affects one of the contacts, then control flows to block 507. If not, then control flows back to block 501 for continued monitoring.

At block 507, a loop of operations begins for each affected contact. At block 509, an adjustment to the priority value associated with the affected contact is determined based on the detected event. At block 511, the priority value is adjusted based on the determined adjustment. At block 513, the contact is marked to indicate a change in priority value. At block 514, control either loops back to block 507 or proceeds to block 515 if there are no other affected contacts. At block 515, the changed priority values are communicated to a server.

The operations depicted in FIGS. 4 and 5 are intended to aid in understanding embodiments and should not be used to limit embodiments. For instance, priority values may be recalculated instead of adjusted. Embodiments may calculate one or more additional values and select a priority value based on another parameter. For example, a new priority value may be calculated and then the old or new priority value selected based on time of day. As another example, block 513 may not be preformed as depicted. Embodiments may build a list of affected contacts and their priority values.

Furthermore, the above operations assume a client perspective. Operations for obtaining priority value or adjusting priority values may be performed at a server. For example, a server may adjust priority values based on detecting particular behavior from a client device (e.g., behavior suggesting a threatening or compromised client device). As another example, a server may set default priority values based on current load on the server and communicate those priority values to a client device.

Although the above illustrations depict more efficient communication of contact information with manipulation of message transmission frequency, contact information may also be communicated more efficiently with manipulation of content of the messages. A presence management system may communicate contact information with mapped values. Contact information may be stored in a hierarchical extensible structure ("hierarchical extensible contact structure"). Devices in a presence management system utilize a mapping scheme to map contact values (e.g., e-mail address, phone number, etc.) to the appropriate field of the hierarchical extensible contact structure. When devices in the presence management system communicate information for thousands of contacts, employing mapped values to navigate the hierarchical extensible contact structure reduces the size of the messages, thus reducing resource consumption (e.g., bandwidth), particularly on the scale of an enterprise.

Figure 6:
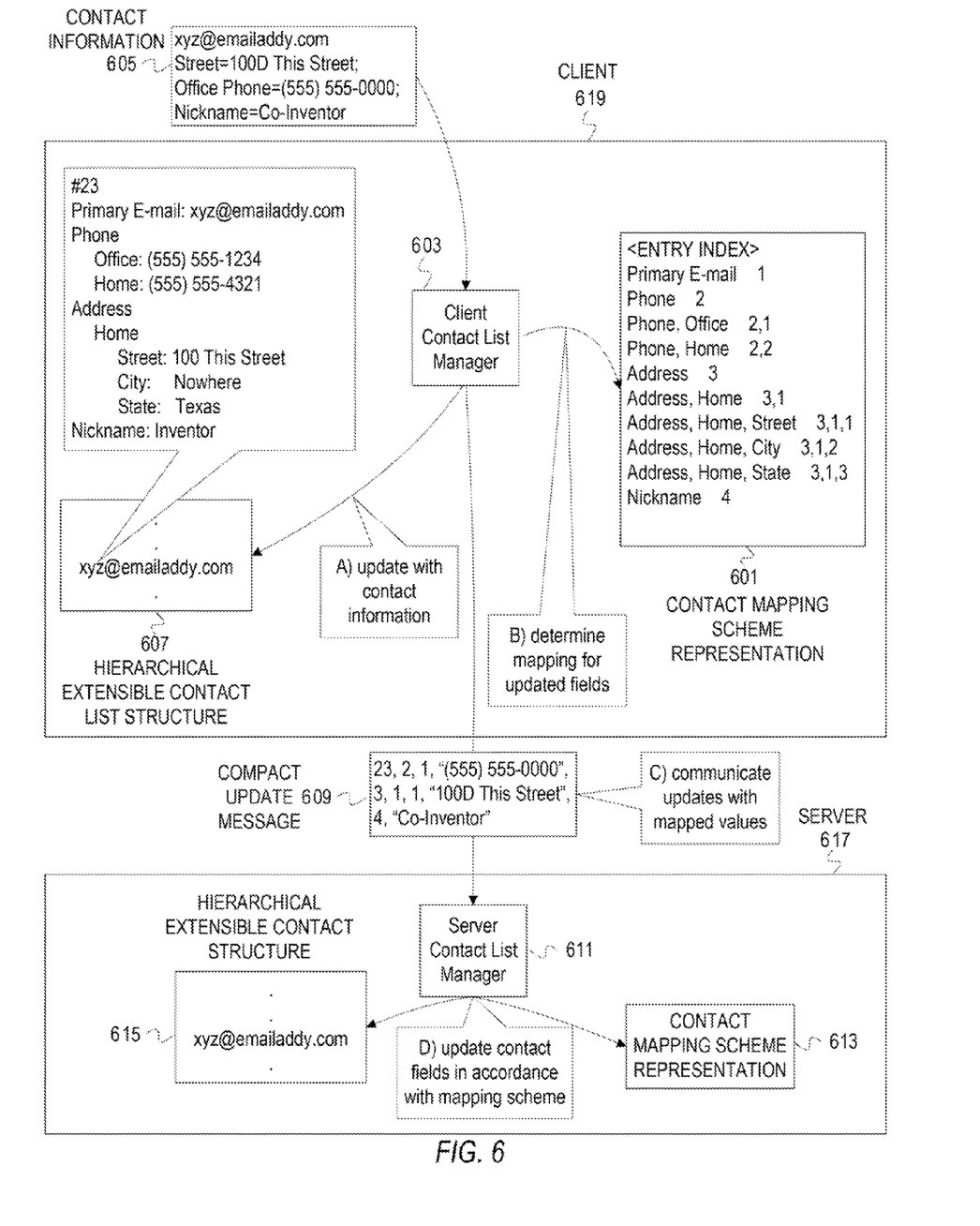
FIG. 6 depicts an example presence management system communicating contact information with mapped values.

FIG. 6 depicts an example presence management system communicating contact information with mapped values. A client 619 includes a hierarchical extensible contact structure 607, a contact management unit 603, and a representation of a contact mapping scheme 601. The contact structure 607 includes a contact identifier "xyz@emailaddy.com." An e-mail address is used as a contact identifier for illustrative purposes. Another value (e.g., a nickname, full legal name, mobile phone number, combination of name and number, etc.) may be used as a contact identifier. The contact xyz@emailaddy.com is depicted as having the following contact information:
Primary E-mail: xyz@emailaddy.com
Phone
   Office: (555) 555-1234
   Home: (555) 555-4321
Address
   Home
     Street: 100 This Street
     City: Nowhere
     State: Texas
Nickname: Inventor In FIG. 6, the entry is depicted as also encoding the entry index "23." The entry for the contact xyz@emailaddy.com may or may not encode the entry index. The contact mapping scheme representation 601 is depicted as mapping contact field identifiers (e.g., Primary E-mail, phone, etc.) to more compact values as follows:
<ENTRY INDEX>
Primary E-mailà1.
Phoneà2
Phone, Officeà2,1
Phone, Homeà2,2
Addressà3
Address, Homeà3,1
Address, Home, Streetà3,1
Address, Home, Cityà3,1,2
Address, Home, Stateà3,1,3
Nicknameà4

In FIG. 6, the contact list manager 601 receives contact information 605 for xyz@emailaddy.com (e.g., a user inputs the information). The contact, information includes a home street address of "100D This Street;" an Office Phone number of "(555) 555-0000;" and Nickname "Co-Inventor." The client contact list manager 603 updates the corresponding entry in the contact structure 607 with the contact information. The client contact list manager 603 then determines mappings for the fields updated with the contact information. With the mapping scheme representation 601, the client contact: list manager 603 determines the following mappings: Home Street Address maps to "3,1,1;" Office Phone maps to "2,2;" and Nickname maps to "4." The client contact list manager 603 generates a compact update message 609 using the mapped values for contact field identifiers, and communicates the new contact information with the compact update message 609 to a server 617. The compact update message 609 encodes the information as follows:
23, 2, 1, "(555) 555-0000",
3, 1, 1, "100D This Street",
4, "Co-Inventor"

The server 617 that receives the compact update message 609 includes a server contact list manager 611, a contact mapping scheme 613, and a hierarchical extensible contact structure 615. The contact mapping scheme representation 613 represents the same mapping scheme as the mapping scheme representation 601. Different techniques can be used to establish the mapping scheme between the client 619 and the server 617. Examples include the client 619 and the server 617 negotiating to establish the mapping scheme, the client 619 selecting a mapping scheme and communicating the selection to the server 617, the server 617 selecting a mapping scheme and communicating the selected mapping scheme to the client 619, etc. The hierarchical extensible contact structure 615 includes an entry for the contact xyz@emailaddy.com.

The server contact list manager 611 updates the contact structure 615 with the contact information in the message 609 in accordance with the mapping represented by the contact mapping scheme representation 613. The server contact list manager 611 determines that xyz@emailaddy.com maps to entry "23." A number of techniques are available for mapping entries to mapping values and may vary with the type of structure(s) used to store contact information. Examples of mapping schemes for entries include numbering of entries, hashing identifying values (e.g., the primary e-mail address), etc. Further, embodiments may use one mapping scheme for the values that identity entries and another mapping scheme for fields and subfields of an entry. After determining that entry 23 maps to xyz@emailaddy.com, the server contact list manager 611 maps "2,1" to the field "Phone" and subfield "Office." The server contact list manager 611 maps "3,1,1" to the field "Address" and subfields "Home" then "Street." The server contact list manager 611 also maps "4" to the field "Nickname."

Figure 7:
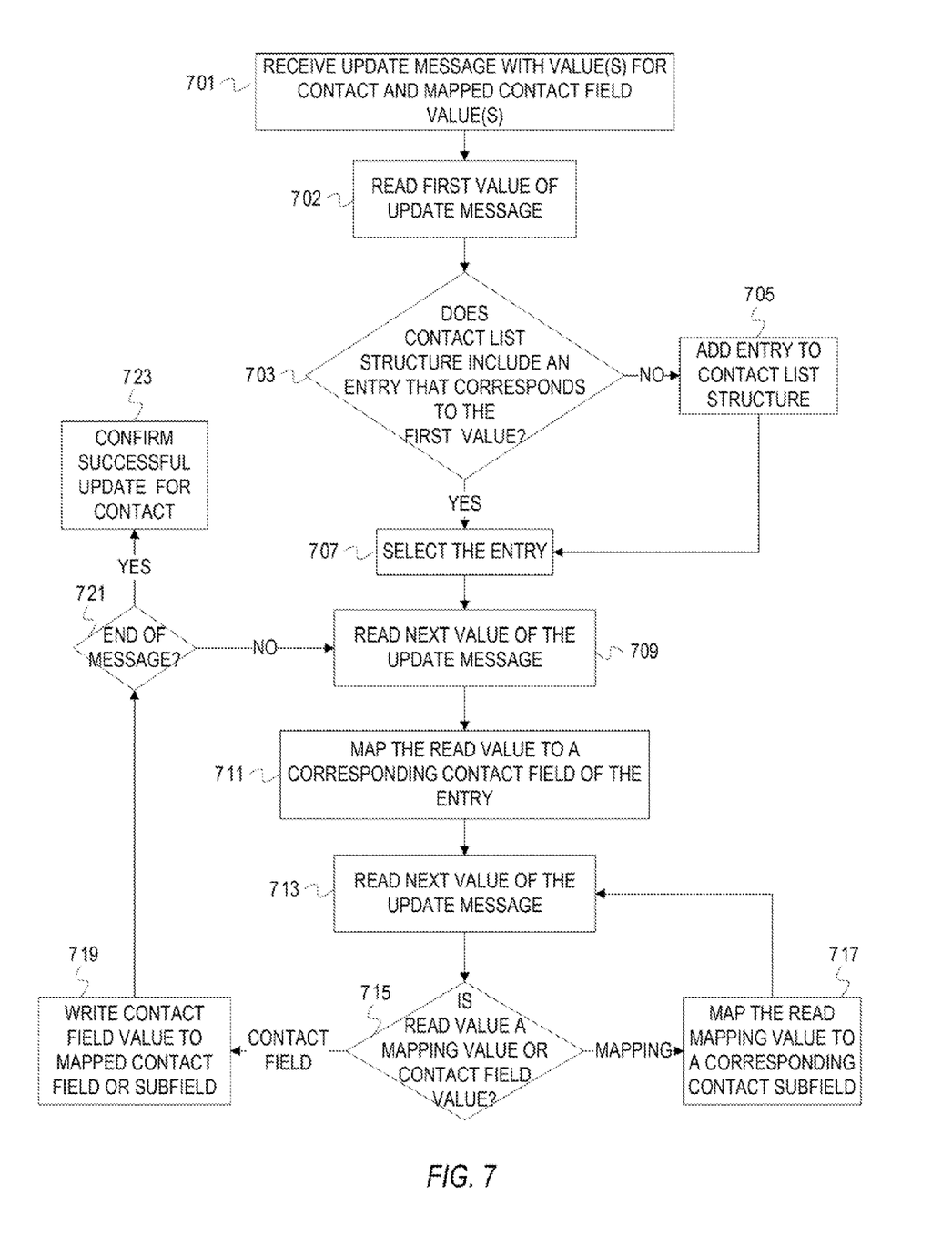
FIG. 7 depicts an example flowchart of example operations for writing contact information using mapped values.

FIG. 7 depicts an example flowchart of example operations for writing contact information using mapped values. At block 701, an update message with one or more values for a contact and mapped contact field values is received. At block 702, the first value of the received message is read. At block 703, it is determined if the hierarchical extensible contact list structure includes an entry that corresponds to the first read value. If the first read value corresponds to an entry in the contact list structure, then control flows to block 707. If not, then control flows to block 705.

At block 705, an entry is added to the contact list structure for the first read value. Control flows from block 705 to block 707.

At block 707, the entry, either the newly added entry or the matching entry, is selected in the contact list structure. At block 709, the next value in the message is read. At block 711, the read value is mapped to a corresponding contact field of the entry. At block 713, the next value in the message is read.

At block 715, it is determined if the read value is a mapped value or a contact field value. For example, a mapped value may be a first data type (e.g., integer), whereas a contact field value is read as a second data type (e.g., string literal). In another example, delimiters may be used to distinguish mapped values from contact field values. As another example, messages may be structured in a manner so that location of a read value can be used to ascertain whether the read value is a mapped value or a contact field value. If the read value is a mapped value, then control flows to block 717. If the read value is a contact field value, then control flows to block 719.

At block 717, the read mapped value is mapped to a corresponding subfield. Control flows from block 717 back to block 713.

At block 719, the contact field value is written into the mapped field or subfield. At block 721, it is determined if the end of the message has been reached. If the end of the message has been reached, then control flows to block 723. If the message still has more values to be read, then control flows back to block 709.

At block 723, successful update of the selected entry is confirmed,

It should be understood that the above operations are used as examples to illustrate embodiments and should not be used to limit embodiments. For example, values may not be read from a message. When a message is received, the message may be parsed into components and stored into different buffers read by different processes. As another example, mapping indices may not be read individually. For example, delimiters may be used to identify the end of a string of mapped values. A contact list: manager or associated process or thread may continue reading all mapped values until reading a mapped value delimiter. The aggregate of read values are then used to map directly to a subfield instead of walking from a parent field down each level of subfield.

Figure 8:
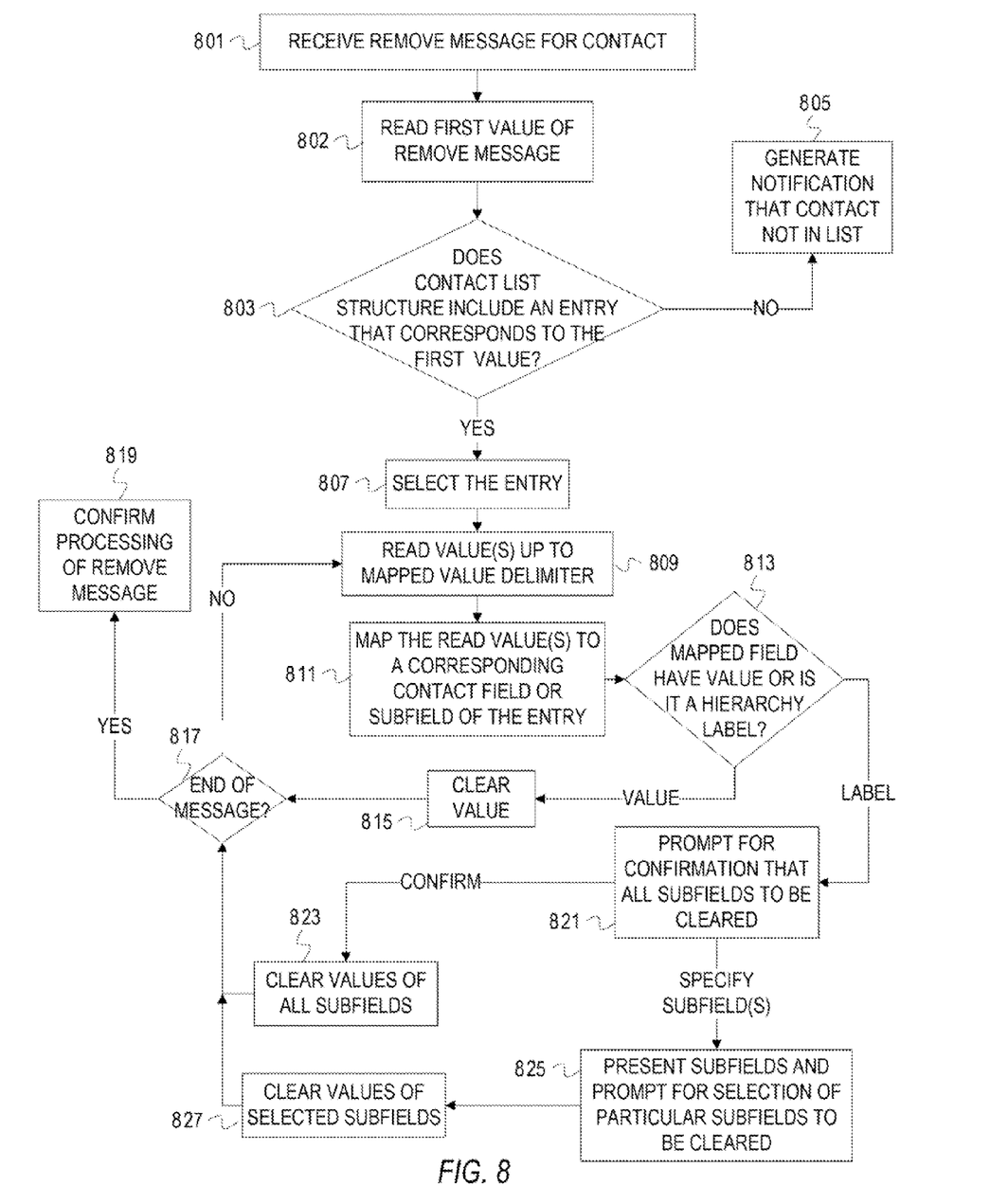
FIG. 8 depicts a flowchart of example operations for clearing information from a hierarchical extensible contact structure.

FIG. 8 depicts a flowchart of example operations for clearing information from a hierarchical extensible contact structure. At block 801, a remove message is received for a contact. At block 802, the first value of the remove message is read. At block 803, it is determined if the contact list structure includes an entry that corresponds to the first read value. If the first read value does not correspond to a first read value, then control flows to block 805. If the first read value corresponds to an entry, then control flows to block 807.

At block 805, a notification is generated to indicate that the contact is not in the list.

At block 807, the entry that corresponds to the first read entry is selected. At block 809, a value(s) is read up to a mapped value delimiter. At block 811, the read value(s) is mapped to a corresponding field or subfield of the selected entry. At block 813, it is determined if the mapped field or subfield hosts a contact field value or is a hierarchy label (e.g., Phone may be a label for Office and Borne phone numbers), if the mapped field or subfield hosts a value, then control flows to block 815. If the mapped field or sub field operates as a hierarchy label, then control flows to block 821.

At block 815, the contact field value is cleared. At block 817, it is determined if the end of the remove message has been reached. If the end of message has been reached, then control flows to block 819. If the end of message has not been reached, then control flows to block 809.

At block 819, processing of the remove message is confirmed.

At block 821, a prompt is made for confirmation that all subfields are to be cleared, if it is confirmed that all subfields of the hierarchy label are to be cleared, then control flows to block 823. If it is not confirmed, then control flows to block 825.

At block 823, the values of the subfields are cleared. Control flows from block 823 to block 817.

At block 825, subfields under the hierarchy label are presented and a prompt is made for selection of particular ones of the presented subfields for clearing of values. At block 827, values of any selected subfields are cleared. Control flows from block 827 to block 817.

The example operations depicted in the flowcharts of FIGS. 7 and 8 assume a message has information for one contact. A message may have information for multiple contacts. Each contact in a message may be identified by data type, value size, contact delimiters, etc. In addition, the operations in FIG. 8 may be different to accommodate message that include commands that designate remove operations. Instead of determining whether to clear a particular field value or values of all subfields, a user may designate and the message encode a command that represents the designation. Further, additional operations may be performed. For instance, addition of an entry or reassigning an entry for a different field or subfield may incur operations to update the mapping scheme representation.

Using direct mapping allows efficient communication of contact Information for a contact represented with one or more hierarchical extensible contact structures. When communications for contacts are made on the scale of thousands, the resources conserved with this efficient communication is substantial. In addition, this direct mapping allows for flexibility with the contact structure without disrupting the mapping. Every entry can be re-indexed as needed and the updated data structure kept in synchronization between devices (e.g., a server device and client devices). For instance, as multiple phone number entries are deleted and new ones are added, the new ones can take the place of the old ones. Referring to FIG. 6 as an illustration, the contact structure may be modified to list a business address instead of a home address. Although the home field would be removed, the mapping for home address elements can be reused for business address elements. This flexibility and recycling keeps the mapping compact, The described embodiments may be provided as a computer program product, or software, that may include a machine-readable medium having stored thereon instructions, which may be used to program a computer system (or other electronic device(s)) to perform a process according to embodiments of the invention(s), whether presently described or not, since every conceivable variation is not enumerated herein. A machine readable medium includes any mechanism for storing ("machine-readable storage medium") or transmitting (machine-readable signal medium") information in a form (e.g., software, processing application) readable by a machine (e.g., a computer). Examples of a machine-readable storage medium include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Examples of machine-readable signal mediums include an electrical, optical, acoustical or other form of propagated signal (e.g., carrier waves, infrared signals, digital signals, etc.), or wireline, wireless, or other communications medium.

Figure 9:
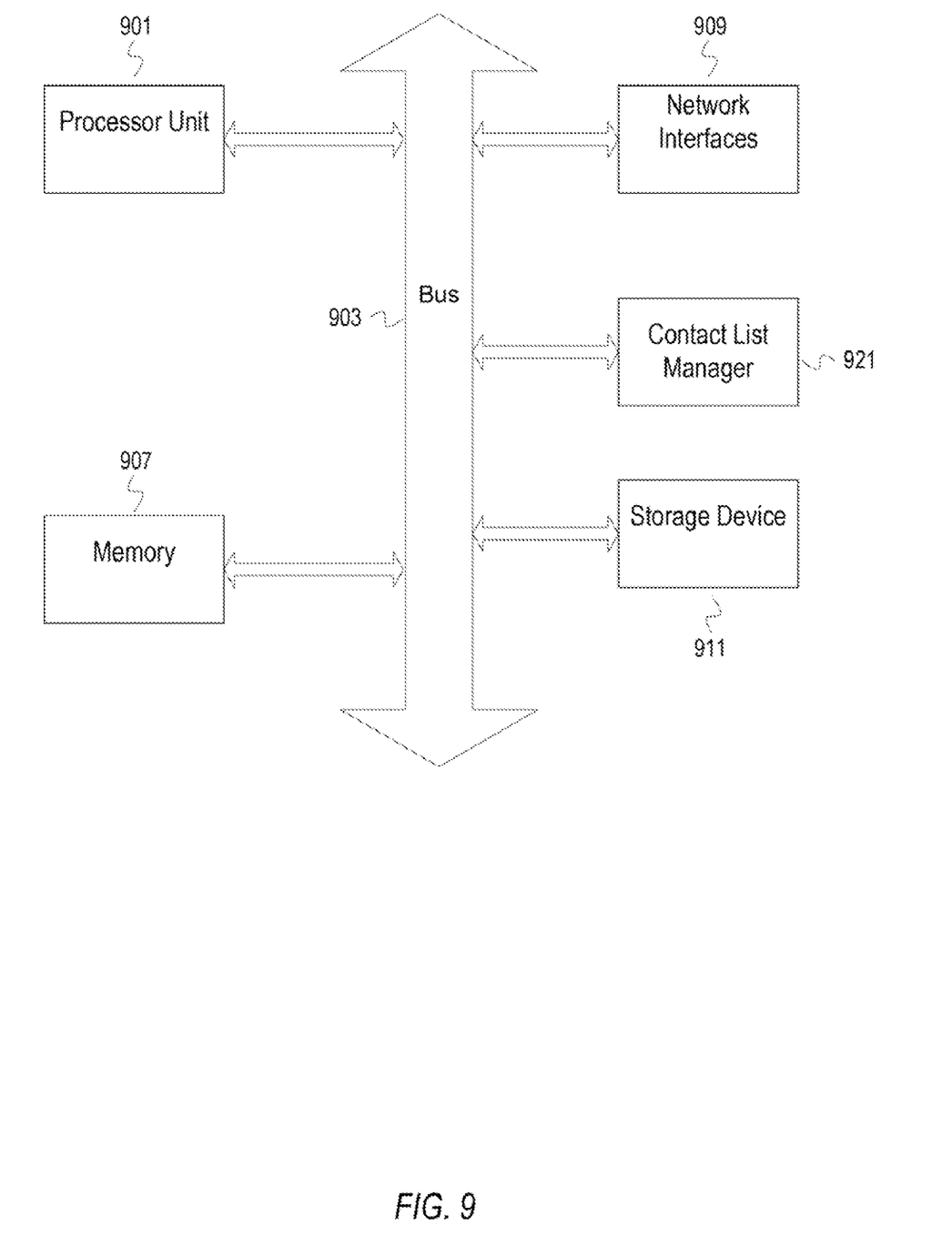
FIG. 9 depicts an example computer system.

FIG. 9 depicts an example computer system. A computer system includes a processor unit 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PQ-Express, HyperTransport®, InfiniBand®, NuBus, etc.), a network interface 909 (e.g., an ATM interface, an Ethernet interface, a Frame Relay interface, SONET interface, wireless interface, etc), and a storage device(s) 911 (e.g., optical storage, magnetic storage, etc.). The system also includes a contact list manager 921. The contact list manager 921 is configured to perform any one or more of the functionalities above for holding and/or releasing contact status updates, prioritizing contacts, regulating flow of contact information based on priority values of contacts, and mapping fields and subfields of a hierarchical extensible contact structure. Although depicted as a separate unit, the contact list manager 921 may be implemented as software encoded in the memory 907, logic in the processing unit 901, as both software and hardware, etc. Further, realizations may include fewer or additional components not illustrated in FIG. 9 (e.g., video cards, audio cards, additional network interfaces, peripheral devices, etc.). The processor unit 901, the storage device(s) 911, the contact list manager 921, and the network interface 909 are coupled to the bus 903. Although illustrated as being coupled to the bus 903, the memory 907 may be coupled to the processor unit 901, While the embodiments are described with reference to various implementations and exploitations, it will be understood that these embodiments are illustrative and that the scope of the invention(s) is not limited to them. In general, techniques for holding and/or releasing contact status updates, prioritizing contacts, regulating flow of contact information based on priority values of contacts, and mapping fields and sub-fields of a hierarchical extensible contact structure as described herein may be implemented with facilities consistent with any hardware system or hardware systems. Many variations, modifications, additions, and improvements are possible.

Further, presence status update for an online contact does not require a user to change presence status on a presence management application at a computer. As stated earlier, presence status can be maintained on a variety of devices including mobile phones, smart phones, laptops, personal data assistants, game consoles, etc. In addition, a change in presence status does not require interaction (or lack, of interaction, e.g., a change to idle status) by a user. For example, missing a call to a mobile phone can trigger a change in presence status for the contact associated, with the mobile phone. As another example, a server can trigger a change in presence status for contacts maintained by the server (e.g., a server forces all presence status to "temporarily unavailable" when network traffic reaches a given threshold).

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and oilier variations, modifications, additions, and improvements may fall within the scope of the invention(s).

What is claimed is:

1. A method comprising:
   mapping an online contact identifier to a first mapping value that corresponds to an entry in a first hierarchical extensible contact list at a first device, wherein the online contact identifier is associated with a plurality of contact values that at least comprise an electronic mail address and a phone number;
   mapping a first of the plurality of contact values to a second mapping value that corresponds to a first field of the first hierarchical extensible contact list, wherein the second mapping value is more compact than an identifier of the first field;
   mapping a second of the plurality of contact values to a third mapping value and a fourth mapping value, wherein the third mapping value corresponds to a second field of the first hierarchical extensible contact list and the fourth mapping value corresponds to a sub-field of the second field of the first hierarchical extensible contact list; and
   generating a contact update message and transmitting the contact update message to a second device for updating a second hierarchical extensible contact list at the second device,
      wherein the contact update message comprises the first mapping value, the second mapping value, the third mapping value, the fourth mapping value, first contact value, and the second contact value,
      wherein the contact update message comprise the first mapping value and the second mapping value instead of the online contact identifier and the identifier of the first field to communicate the first contact value to the second device for updating the second hierarchical extensible contact list at the second device with the first contact value,
      wherein the contact update message comprises the third mapping value and the fourth mapping value instead of an identifier of the second field and an identifier of the sub-field to communicate the second contact value to the second device for updating the second hierarchical extensible contact list, wherein the third mapping value and the fourth mapping value are respectively more compact than an identifier of the second field and an identifier of the sub-field,
      wherein a same mapping scheme has been established for the first and the second hierarchical extensible contact lists.

2. The method of claim 1, wherein the second mapping value is an integer data type and the identifier of the first field is a string data type.

3. The method of claim 1, wherein the plurality of contact values further comprise at least one of a second phone number, a second electronic mail address, a geographic location, an online presence status, a mailing address, and a power mode.

4. The method of claim 1 further comprising reusing the first mapping value for a different online contact identifier.

5. A program product encoded in one or more machine-readable storage media, the program product comprising:
   code executable to map an online contact identifier to a first mapping value that corresponds to an entry in a first hierarchical extensible contact list at a first device, wherein the online contact identifier is associated with a plurality of contact values that at least comprise an electronic mail address and a phone number;

code executable to map a first of the plurality of contact values to a second mapping value that corresponds to a first field of the first hierarchical extensible contact list, wherein the second mapping value is more compact than an identifier of the first field;

code executable to map a second of the plurality of contact values to a third mapping value and a fourth mapping value, wherein the third mapping value corresponds to a second field of the first hierarchical extensible contact list and the fourth mapping value corresponds to a sub-field of the second field of the first hierarchical extensible contact list;

code executable to generate a contact update message that comprises the first mapping value, the second mapping value, the third mapping value, the fourth mapping value, the first contact value, and the second contact value; and code executable to transmit the contact update message to a second device for the second device to update a second hierarchical extensible contact list with the first contact value and the second contact value, wherein the contact update message comprises the first mapping value and the second mapping value instead of the online contact identifier and the identifier of the first field to communicate the first contact value to the second device for updating, the second hierarchical extensible contact list at the second device with the first contact value, wherein the contact update message comprises the third mapping value and the fourth mapping value instead of an identifier of the second field and an identifier of the sub-field to communicate the second contact value to the second device for updating the second hierarchical extensible contact list, wherein the third mapping value and the fourth mapping value are respectively more compact than an identifier of the second field and an identifier of the sub-field, wherein a same mapping scheme has been established for the first and the second hierarchical extensible contact lists.

6. The program product of claim 5, wherein the second mapping value is an integer data type and the identifier of the first field is a string data type.

7. The program product of claim 5, wherein the plurality of contact values further comprises at least one of a second phone number, a geographic location, an online presence status, a second e-mail address, and a power mode.

8. An apparatus comprising:

a processor;

memory;

one or more network interfaces configured to receive and to send contact values; and a contact list manager configured to, map an online contact identifier to a first mapping value that corresponds to an entry in a first hierarchical extensible contact list at a first device, wherein the online contact identifier is associated with a plurality of contact values that at least comprise an electronic mail address and a phone number;

map a first of the plurality of contact values to a second mapping value that corresponds to a first field of the first hierarchical extensible contact list, wherein the second mapping value is more compact than an identifier of the first field;

map a second of the plurality of contact values to a third mapping value and a fourth mapping value, wherein the third mapping value corresponds to a second field of the first hierarchical extensible contact list and the fourth mapping value corresponds to a sub-field of the second field of the first hierarchical extensible contact list;

generate a contact update message that comprises the first mapping value, the second mapping value, the third mapping value, the fourth mapping value, the first contact value, and the second contact value; and transmit the contact update message to a second device for the second device to update a second hierarchical extensible contact list with the first contact value and the second contact value, wherein the contact update message comprises, the first mapping value and the second mapping value instead of the online contact identifier and the identifier of the first field to communicate the first contact value to the second device for updating of the second hierarchical extensible contact list at the second device with the first contact value, wherein the contact update message comprises the third mapping value and the fourth mapping value instead of an identifier of the second field and an identifier of the sub-field to communicate the second contact value to the second device for updating the second hierarchical extensible contact list, wherein the third mapping value and the fourth mapping value are respectively more compact than an identifier of the second field and an identifier of the sub-field, wherein a same mapping scheme has been established for the first and the second hierarchical extensible contact lists.

9. The apparatus of claim 8, wherein the second mapping value is an integer data type and the first field of the hierarchical extensible contact list is a string data type.

10. A system comprising:

a first device comprising a processor and a memory, the first device:

mapping an online contact identifier to a first mapping value that corresponds to an entry in a first hierarchical extensible contact list, wherein the online contact identifier is associated with a plurality of contact values that at least comprise an electronic mail address and a phone number, mapping a first of the plurality of contact values to a second mapping value that corresponds to a first field of the first hierarchical extensible contact list, wherein the second mapping value is more compact than an identifier of the first field, mapping a second of the plurality of contact values to a third mapping value and a fourth mapping value, wherein the third mapping value corresponds to a second field of the first hierarchical extensible contact list and the fourth mapping value corresponds to a sub-field of the second field of the first hierarchical extensible contact list, generating and transmitting a contact update message with the first mapping value, the second mapping value, and the first contact value instead of the online contact identifier, the identifier of the first field and the first contact value to communicate the first contact value, and with the third mapping value and the fourth mapping value instead of an identifier of the second field and an identifier of the sub-field to communicate the second contact value to the second device for updating the second hierarchical extensible contact list with the second contact value, wherein the third mapping value and the fourth mapping value are respectively more compact than an identifier of the second field and an identifier of the sub-field; and a second device comprising a processor and a memory, the second device:

receiving the contact update message;

mapping the first mapping value to an entry in a second hierarchical extensible contact list for the online contact identifier, mapping the second mapping value to a first field of the entry in the second hierarchical extensible contact list, wherein the first field of the second hierarchical extensible contact list corresponds to the first field of the first hierarchical extensible contact list, and writing the first contact value to the first field of the second hierarchical extensible contact list mapping the second mapping value to a second field of the second hierarchical extensible contact list, wherein the second field of the second hierarchical extensible contact list corresponds to the second field of the first hierarchical extensible contact list;

mapping the third mapping value to a sub-field of the second field of the second hierarchical extensible contact list, wherein the sub-field of the second field of the second hierarchical extensible contact list corresponds to the second sub-field of the second field of the first hierarchical extensible contact list; and writing the second contact value to the sub-field of the second field of the second hierarchical extensible contact list.

* * * * *